(12) United States Patent
Atherton

(10) Patent No.: US 8,169,318 B2
(45) Date of Patent: May 1, 2012

(54) RADIO FREQUENCY IDENTIFICATION TAG WITH TAMPER DETECTION CAPABILITY

(75) Inventor: Peter Samuel Atherton, Leesburg, VA (US)

(73) Assignee: Mikoh Corporation, McLean, VA (US)

( * ) Notice: Subject to any disclaimer, the term of this patent is extended or adjusted under 35 U.S.C. 154(b) by 349 days.

(21) Appl. No.: 10/569,946

(22) PCT Filed: Aug. 30, 2004

(86) PCT No.: PCT/US2004/027906
§ 371 (c)(1),
(2), (4) Date: Jul. 31, 2006

(87) PCT Pub. No.: WO2005/022443
PCT Pub. Date: Mar. 10, 2005

(65) Prior Publication Data
US 2007/0029384 A1 Feb. 8, 2007

Related U.S. Application Data

(60) Provisional application No. 60/498,661, filed on Aug. 29, 2003, provisional application No. 60/502,286, filed on Sep. 12, 2003, provisional application No. 60/552,397, filed on Mar. 12, 2004, provisional application No. 60/588,936, filed on Jul. 19, 2004.

(51) Int. Cl.
*G08B 13/14* (2006.01)
(52) U.S. Cl. ........... 340/572.1; 340/572.2; 340/572.4; 340/572.7; 340/572.8; 343/718; 343/878
(58) Field of Classification Search ....... 340/571–572.9, 340/10.52; 343/718, 878, 867
See application file for complete search history.

(56) References Cited

U.S. PATENT DOCUMENTS

| | | | | |
|---|---|---|---|---|
| 5,430,441 A | * | 7/1995 | Bickley et al. | 340/10.2 |
| 5,884,425 A | * | 3/1999 | Baldwin | 40/638 |
| 5,892,661 A | * | 4/1999 | Stafford et al. | 361/737 |
| 6,050,622 A | * | 4/2000 | Gustafson | 292/307 R |
| 6,094,133 A | * | 7/2000 | Shimamura et al. | 340/505 |
| 6,181,287 B1 | * | 1/2001 | Beigel | 343/741 |
| 6,421,013 B1 | * | 7/2002 | Chung | 343/700 MS |
| 6,518,887 B2 | * | 2/2003 | Suzuki et al. | 340/572.8 |
| 6,569,508 B2 | * | 5/2003 | Babb et al. | 428/40.1 |

(Continued)

FOREIGN PATENT DOCUMENTS

WO  WO 01/71848 A1 * 9/2001

*Primary Examiner* — Daniel Wu
*Assistant Examiner* — Son M Tang
(74) *Attorney, Agent, or Firm* — Buchanan Ingersoll & Rooney PC

(57) ABSTRACT

An RFID tag includes a substrate having a top surface and a bottom surface. An RFID integrated circuit is disposed on the top surface of the substrate. A first electrically conductive region is associated with the top surface of the substrate and electrically coupled to the RFID integrated circuit. A second electrically conductive region is associated with the bottom surface of the substrate and electrically coupled to the first conductive region, the first and second conductive regions forming an RFID antenna. The RFID integrated circuit, first conductive region and second conductive region together provide an RFID function. An attachment layer is associated with the bottom surface of the substrate for attaching the tag to a surface. An adhesion modifying layer modifies the adhesion of the second conductive region such that the second conductive region is disrupted if the tag is tampered or removed from the surface.

22 Claims, 5 Drawing Sheets

U.S. PATENT DOCUMENTS

| | | |
|---|---|---|
| 6,680,702 B2 * | 1/2004 | Yde-Andersen et al. .................. 343/700 MS |
| 6,700,796 B2 * | 3/2004 | Detcheverry et al. ......... 361/792 |
| 6,794,000 B2 * | 9/2004 | Adams et al. ................ 428/40.1 |
| 6,859,745 B2 * | 2/2005 | Carr et al. ....................... 702/81 |
| 6,888,509 B2 | 5/2005 | Atherton |
| 7,095,324 B2 * | 8/2006 | Conwell et al. ............ 340/572.1 |
| 7,102,522 B2 * | 9/2006 | Kuhns ........................ 340/572.7 |
| 2002/0067264 A1 * | 6/2002 | Soehnlen .................. 340/572.1 |
| 2003/0016133 A1 * | 1/2003 | Egbert ....................... 340/572.7 |

* cited by examiner

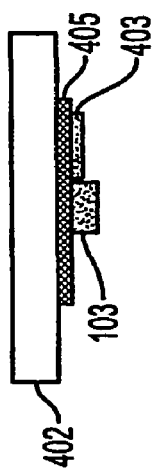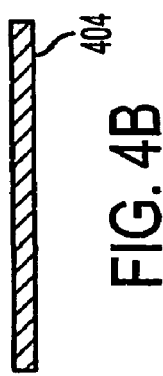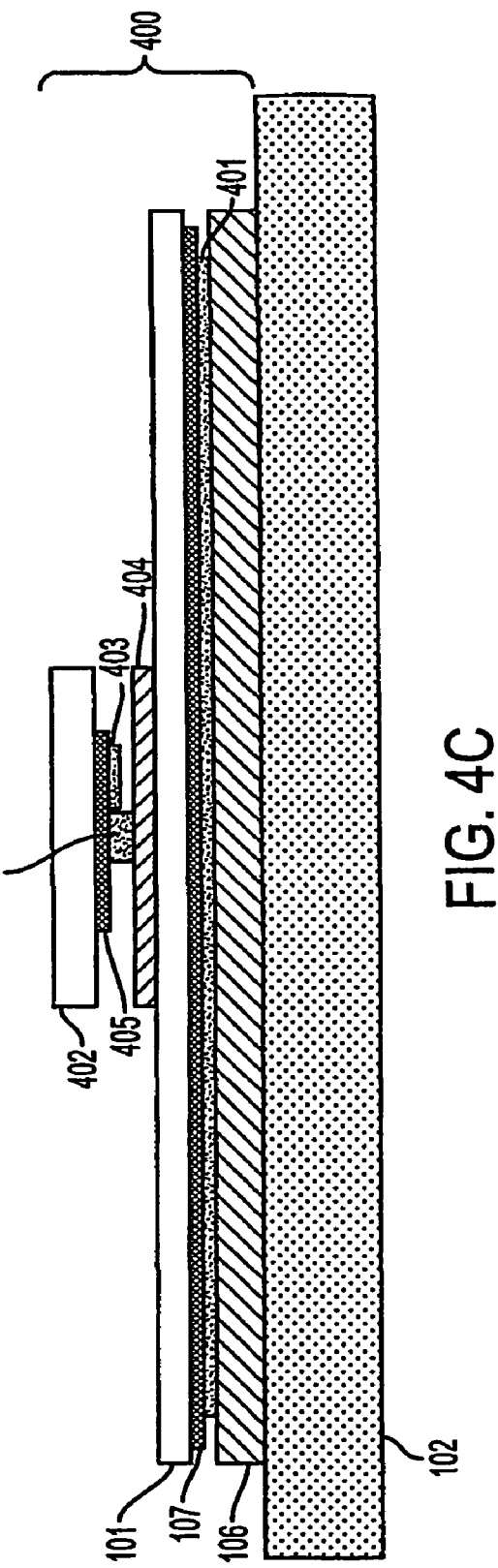

RADIO FREQUENCY IDENTIFICATION TAG WITH TAMPER DETECTION CAPABILITY

This application is a U.S. national stage application of International Application No. PCT/US2004/027906 filed on Aug. 30, 2004, the entire content of which is hereby incorporated by reference. This application also claims priority under 35 U.S.C. §119 to U.S. Provisional Application No. 60/498,661 filed on Aug. 29, 2003; U.S. Provisional Application No. 60/502,286 filed on Sep. 12, 2003, U.S. Provisional Application No. 60/552,397 filed on Mar. 12, 2004, and U.S. Provisional Application No. 60/588,936 filed on Jul. 19, 2004.

BACKGROUND TO THE INVENTION

Radio Frequency Identification (RFID) is widely expected to be the next-generation automated identification technology, superseding barcode technology in many applications.

In some applications there is a need for RFID tags to be able to indicate if they are tampered with or moved from one item or location to another. In such applications preferably the RFID function of an RFID tag will be modified if the tag is tampered or removed. In some applications it is preferred that an RFD tag provide a positive indication of tampering, and that at least some RFID function should continue after tampering or removal, such that information stored in the tag continues to be readable.

There is also a need for RFID tags to be produced at low cost in order to be suitably priced for high-volume applications.

A disadvantage of current RFID tag designs is that they either do not provide a tamper detection function or do provide a tamper detection function but in a complex and expensive product design.

DISCLOSURE OF THE INVENTION

In an exemplary embodiment of the invention, an RFD tag is provided. The tag comprises a substrate having a top surface and a bottom surface; an RFID integrated circuit disposed on the top surface of the substrate; a first electrically conductive region associated with the top surface of the substrate and electrically coupled to the RFD integrated circuit; a second electrically conductive region associated with the bottom surface of the substrate and electrically coupled to the first conductive region, the first and second conductive regions forming an RFID antenna; the RFID integrated circuit, first conductive region and second conductive region together providing an RFID function; an attachment layer associated with the bottom surface of the substrate for attaching the tag to a surface; and an adhesion modifying layer modifying the adhesion of the second conductive region such that the second conductive region is disrupted if the tag is tampered or removed from the surface.

In another embodiment of the invention an RFID tag, comprises: a substrate having a top surface and a bottom surface; an RFID integrated circuit disposed on the top surface of the substrate; a first electrically conductive region disposed on the top surface of the substrate and electrically coupled to the RFID integrated circuit, the first conductive region forming an RFID antenna; a second electrically conductive region disposed on the bottom surface of the substrate and electrically coupled to the RFD integrated circuit, the RFID integrated circuit adapted to detect at least one electrical property of the second conductive region; an attachment layer for attaching the tag to a surface, the attachment layer being associated with the bottom of the substrate; and an adhesion modifying layer modifying the adhesion of the second conductive region such that the second conductive region is disrupted if the tag is tampered or removed from the surface, thereby modifying the at least one electrical property of the second conductive region detected by the RFID integrated circuit.

In another embodiment of the invention an RFID tag comprises: a first substrate having a top surface and a bottom surface; an electrically conductive region disposed on the bottom surface of the substrate, the conductive region forming an RFID antenna; a first attachment layer for attaching the tag to a surface, the first attachment layer being associated with the bottom surface of the first substrate; a first adhesion modifying layer modifying the adhesion of the electrically conductive region such that the electrically conductive region is disrupted if the tag is tampered or removed from the surface; a second substrate having a top surface and a bottom surface; a second attachment layer associated with the bottom surface of the second substrate and attaching the second substrate to the top surface of the first substrate; an RFID integrated circuit disposed on the bottom surface of the second substrate and electrically coupled to the electrically conductive region; and a second adhesion modifying layer modifying the adhesion of the RFID integrated circuit such that the RFID integrated circuit is modified if the second substrate is removed from the first substrate.

In another embodiment of the invention, an RFID tag comprises: a first substrate having a top surface and a bottom surface; a first electrically conductive region disposed on the top surface of the first substrate, the first conductive region forming an RFID antenna; a second electrically conductive region disposed on the bottom surface of the first substrate; a first attachment layer for attaching the tag to a surface, the first attachment layer being associated with the bottom surface of the first substrate; a first adhesion modifying layer modifying the adhesion of the second electrically conductive region such that the second electrically conductive region is disrupted if the tag is tampered or removed from the surface; a second substrate having a top surface and a bottom surface; a second attachment layer associated with the bottom surface of the second substrate and attaching the second substrate to the first substrate; an RFID integrated circuit disposed on the bottom surface of the second substrate and electrically coupled to the first and second electrically conductive regions; a second adhesion modifying layer modifying the adhesion of the RFID integrated circuit such that the RFID integrated circuit is disrupted if the second substrate is removed from the first substrate.

In another embodiment of the invention, a method of forming an RFID tag is provided. The method comprises: disposing an electrically conductive region on a bottom surface of a first substrate; disposing an RFID integrated circuit on the bottom surface of a second substrate; associating a first attachment layer with the bottom surface of the first substrate to attach the tag to a surface; associating a second attachment layer with the bottom surface of the second substrate; attaching the bottom surface of the second substrate to the top surface of the first substrate so that the RFID integrated circuit is coupled to the conductive region; providing a first adhesion modifying layer to modify the adhesion of the conductive region such that the conductive region is disrupted if the first substrate is tampered or removed from the surface; and providing a second adhesion modifying layer to modify the adhesion of the RFID integrated circuit such that the RFID integrated circuit is disrupted if the second substrate is removed from the first substrate.

In another embodiment of the invention, an RFID tag comprises: a first substrate having a top surface and a bottom surface; an electrically-conductive region disposed on the bottom surface of the first substrate, the conductive region forming an RFID antenna; a first attachment layer for attaching the tag to a surface, the first attachment layer being associated with the bottom surface of the first substrate; an RFID integrated circuit disposed on the top surface of the first substrate and electrically coupled to the electrically conductive region; a first adhesion modifying layer modifying the adhesion of the conductive region such that the conductive region is disrupted if the first substrate is tampered or removed from the surface; and a second adhesion modifying layer modifying the adhesion of the RFD integrated circuit such that the RFID integrated circuit is disrupted if it is removed from the first substrate.

In another embodiment of the invention, an RFID tag comprises: a substrate having a top surface and a bottom surface; an RFD integrated circuit disposed on the top surface of the substrate; a first electrically conductive region associated with the top surface of the substrate and electrically coupled to the RFID integrated circuit via non-contact coupling, the first conductive region forming an RFID antenna; a second electrically conductive region associated with the bottom surface of the substrate and electrically coupled to the RFID circuit via non-contact coupling; an attachment layer associated with the bottom surface of the substrate for attaching the tag to a surface; and an adhesion modifying layer modifying the adhesion of the second conductive region such that the second conductive region is disrupted if the tag is tampered or removed from the surface.

Preferably but not necessarily the RFID IC may store information representing values of the specified electrical properties of the tamper detection circuit, and may compare measured values of the specified electrical properties with the stored values of the specified electrical properties, and may store or transmit information indicative of the difference(s) between the measured and the stored values of the specified electrical properties.

In some preferred embodiments part of the memory contents of the RFID IC may be permanently modified if the RFID IC detects tampering of the RFID tag by detecting a change in the specified electrical properties of the tamper detection circuit.

Preferably the first attachment means may be an adhesive layer.

Preferably the second attachment means may be an adhesive layer.

Preferably the non-contact electrical coupling means may be a capacitive coupling means or an inductive coupling means.

Preferably graphics, including but not limited to images, logos, alphanumeric characters, barcodes and 2-dimensional barcodes, will be applied to the first or second RFID tag so as to be visible from the top side or from the underside of the RFID tag.

BRIEF DESCRIPTION OF THE FIGURES

The present invention is described by way of non-limiting example with reference to the accompanying figures, wherein:

FIG. 4A is a schematic illustration of the second substrate of the embodiment of FIG. 4C, and the RFID components attached to the second substrate;

FIG. 4B is a schematic illustration of the attachment layer used to attach the second substrate in the embodiment of FIG. 4C;

FIG. 4C is a schematic illustration of an RFID tag that is disabled if it is tampered and in which the RFID IC is applied by means of a second substrate;

DESCRIPTION OF THE INVENTION

For clarity of illustration, the thicknesses of the layers in the figures are exaggerated.

Also, for clarity of illustration some of the layers and components in the illustrations are shown separated. In practice, when the RFID tag is assembled the layers will be brought together and will bend or distort around any bumps or irregularities due to the RFID integrated circuit (IC) or other components within the tag construction.

In general an RFID tag includes a data storage integrated circuit (IC), sometimes referred to as a chip. Several different categories of RFID IC exist, including:
  a read-only IC,
  a write-once read-many IC,
  a read-write IC.

Various embodiments of the present invention may be implemented with any type of RFID IC.

An RFID tag may be either a so-called "active" tag or a so-called "passive" tag. An active RFID tag is one that carries an on-board power source such as a battery, while a passive RFID tag is one that does not carry an on-board power source and is usually powered by radio frequency energy from a reading device as the reading device reads the passive tag.

As used herein, the term impedance refers to electrical impedance, including resistive, capacitive and inductive components. This impedance is sometimes referred to as the complex impedance, due to the fact that resistive, capacitive and inductive impedance components have a phase shift relative to each other.

The terms non-contact electrical coupling circuit, non-contact coupling circuit, non-contact coupling pad (or pads), coupling circuit, and coupling pad (or pads) all have essentially the same meaning, and refer to an electrical circuit that facilitates non-contact electrical coupling to another electrical circuit or component.

Figure 1:
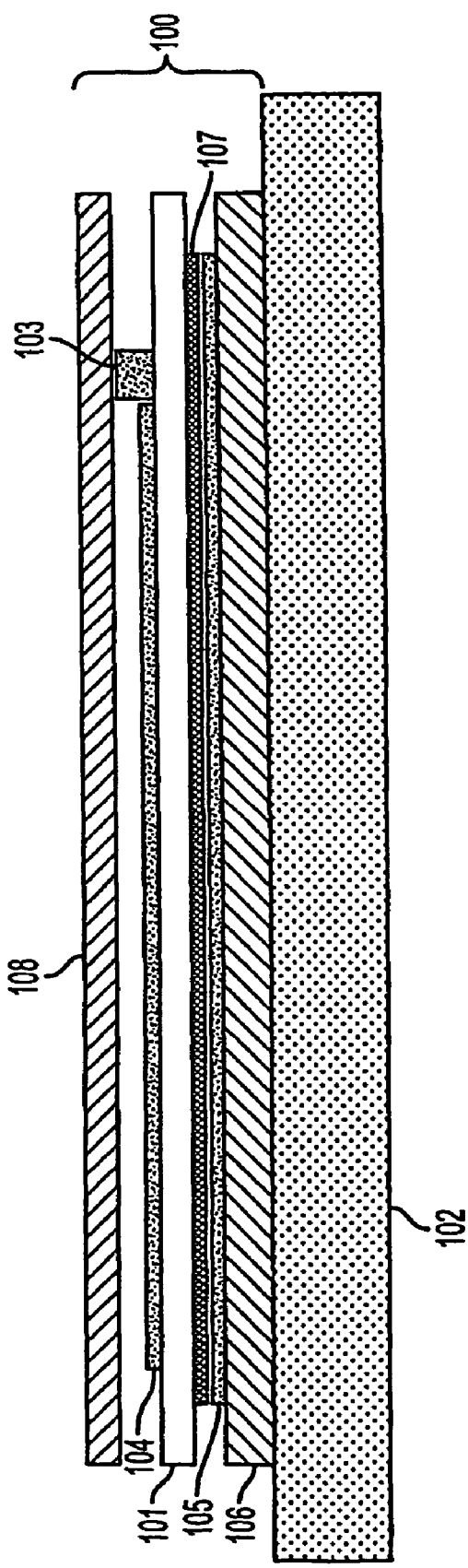
FIG. 1 is a schematic illustration of an RFID tag that is disabled if it is tampered.

FIG. 1 shows a preferred embodiment of the present invention. Other preferred embodiments are described below.

FIG. 1 is a schematic illustration of the tamper-indicating RFID tag 100 that is designed to be disabled or at least have its RFID performance degraded if it is tampered or removed from a surface to which it has been applied.

The RFID tag 100 of FIG. 1 includes a substrate layer 101. In use the RFID tag 100 of FIG. 1 is applied to a receiving surface 102 with the underside of the substrate layer 101 closer to the surface 102 than the top side of the substrate layer 101.

An RFID IC 103 is applied to, or applied adjacent to, the top surface of the substrate 101.

A first electrically conductive region 104 is applied to or adjacent to the top surface of the substrate 101 and is electrically coupled to the RFID IC 103. The first electrically conductive region 104 may be a layer of conductive material applied in a specified pattern on or adjacent to the top surface of the substrate 101. In the embodiment of FIG. 1 the RFID IC 103 and first electrically conductive region 104 are connected together via a direct electrical connection. It should be appreciated that in other embodiments the RFID IC 103 and first electrically conductive region 104 may be coupled via a non-contact electrical coupling method.

A second electrically conductive region 105 is applied to or adjacent to the bottom surface of the substrate 101 and electrically coupled to the first electrically conductive region 104. The second electrically conductive region 105 may be a layer of conductive material applied in a specified pattern on or adjacent to the bottom surface of the substrate 101.

An attachment layer 106 is applied to the bottom surface of the substrate layer 101, covering the second electrically conductive region 105. The attachment layer 106 attaches the RFID tag 100 to the surface 102. Preferably the attachment layer 106 may be a layer of adhesive.

In the embodiment of FIG. 1 the second electrically conductive region 105 is coupled to the first electrically conductive region 104 through the substrate 101 via a non-contact electrical coupling means such as capacitive coupling or inductive coupling. It should be appreciated that in some embodiments coupling of the second electrically conductive region 105 to the first electrically conductive region 104 may instead be via direct electrical connection.

In the embodiment of FIG. 1 the first electrically conductive region 104 and second electrically conductive region 105 together provide an RFID antenna for the tag 100. The second electrically conductive region 105 is coupled to the first electrically conductive region through the substrate layer 101 by means of a non-contact coupling method. The first electrically conductive region 104 is directly connected to the RFID IC 103. The RFID IC 103, first electrically conductive region 104 and second electrically conductive region 105 together provide an RFID function for the tag 100, such that the RFID IC 103 is able to communicate, for example via radio frequency (RF) means, with a remote RF reading or writing device in a manner that allows the remote RF device to detect the RFID IC 103, or read data that is stored in the RFID IC 103, or write data to the RFID IC 103.

Preferably the RFID tag 100 is configured such that the second electrically conductive region 105 is disrupted or damaged, and its electrical properties modified, if the RFID tag 100 is tampered or removed from the surface 102. In the preferred embodiment of FIG. 1 the first electrically conductive region 104 and second electrically conductive region 105 together form an RFID antenna and so the RFID function of the tag 100 will be affected, and preferably disabled completely, if the electrical properties of the second electrically conductive region 105 are modified. In this way the tag 100 provides a tamper indication function through its RFID function being disabled, or at least modified, if the tag 100 is tampered or removed from the surface 102. To promote damage or disruption to the second electrically conductive region 105 one or more adhesion modifying layers 107 may be applied between the substrate 101 and the attachment layer 106 so as to modify the relative adhesion of the substrate 101, the second electrically conductive region 105, and the attachment layer 106 in order to result in damage or disruption to the second electrically conductive region 105 on tampering or removal. In FIG. 1 the adhesion modifying layers 107 (there may be one or more) are shown between the substrate 101 and the second electrically conductive region 105, but it should be appreciated that the adhesion modifying layers 107 may instead or also be applied between the second electrically conductive layer 105 and the attachment layer 106. The adhesion modifying layers 107 may be applied in a specified pattern (as viewed from below the substrate 101) so as to create a plurality of areas of differing relative adhesion strengths and thereby promote disruption or damage to the second electrically conductive region 105 if the tag 100 is tampered or removed from the surface 102. Where present, the adhesion modifying layer 107 modifies adhesion of the layers that it separates. The adhesion modifying layer 107 may either enhance or reduce the adhesion of two layers that it separates. Preferably, but not necessarily, the adhesion modifying layer 107 will reduce the adhesion of two layers that it separates. In one preferred embodiment an adhesion modifying layer 107 is applied in a specified pattern between the substrate 101 and second electrically conductive region 105 and reduces adhesion of the electrically conductive region 105 to the substrate 101 in those areas where the adhesion modifying layer 107 is applied, and in those areas thereby promotes damage to the second electrically conductive region 105 or selective delamination of the second electrically conductive region 105 from the substrate 101 if the tag 100 is tampered with or removed from the surface 102. In a variation on this embodiment, the adhesion modifying layers 107 may comprise a treatment on the surface on the underside of the substrate 101, either uniformly or in a specified pattern, such that in the treated areas the adhesion to the substrate 101 of an adjacent layer is modified, either by being increased or by being decreased, relative to the adhesion of the adjacent layer to the substrate 101 in areas where the surface treatment has not been undertaken.

Preferably the second electrically conductive region 105, adhesion modifying layer 107 and attachment layer 106 are configured and formulated so as to promote damage to the second electrically conductive region 105 even if a sophisticated attempt is made to surreptitiously tamper with or remove the tag 100 by using mechanical, chemical, temperature-based, or other methods to assist in tampering or removal of the tag 100.

It should be appreciated that variations on the methods described herein may be employed to promote damage or modification to the second electrically conductive region 105 if the tag 100 is tampered with or removed from the surface 102.

Preferably the second electrically conductive region 105 will be made from a layer of electrically conductive material that has suitable electrical properties but that is intrinsically weak, so that it will be more readily damaged or disrupted if the RFID tag 100 is tampered or removed from the surface 102. An example of a suitable material for the second electrically conductive region 105 is electrically conductive ink, which can be applied in a specified pattern by means of a printing process.

The first electrically conductive region 104 does not need to be damaged in order for the RFID performance of the tag 100 to be degraded or disabled if the tag 100 is tampered or removed from the surface 102. In fact the first electrically conductive region 104 is normally not damaged or disrupted if the tag 100 is tampered or removed from the surface 102, since it is protected by the substrate 101. Hence the first electrically conductive region 104 may be made from a different conductive material than the second electrically conductive region 105, and specifically does not have to be made from a weak or frangible conductive material. For example, the first electrically conductive region 104 may be a layer of solid metal conductor such as a layer of copper or aluminum applied in a specified pattern. An advantage of using a solid metal conductor for the first electrically conductive region 104 is that solid metals usually have better electrical conductivity than conductive ink, which may provide better overall performance for the RFID antenna made up of the combination of the first electrically conductive region 104 and second electrically conductive region 105.

All or part of the top surface of the substrate 101, including the first electrically conductive region 104, the RFID IC 103, and any other electronics on the top side of the substrate 101, may be covered by an overlaminate layer 108 so as to provide physical protection for the components.

Printed graphics, such as images, logos, alphanumerics, barcodes and 2-dimensional barcodes, may be applied to the tag 100 so as to be visible from the top side or underside of the tag 100. The application of printed graphics in such a way as to be visible from the underside of the tag 100 is beneficial if the tag 100 is applied to a transparent surface 102 such as a vehicle windshield or window.

Figure 2:
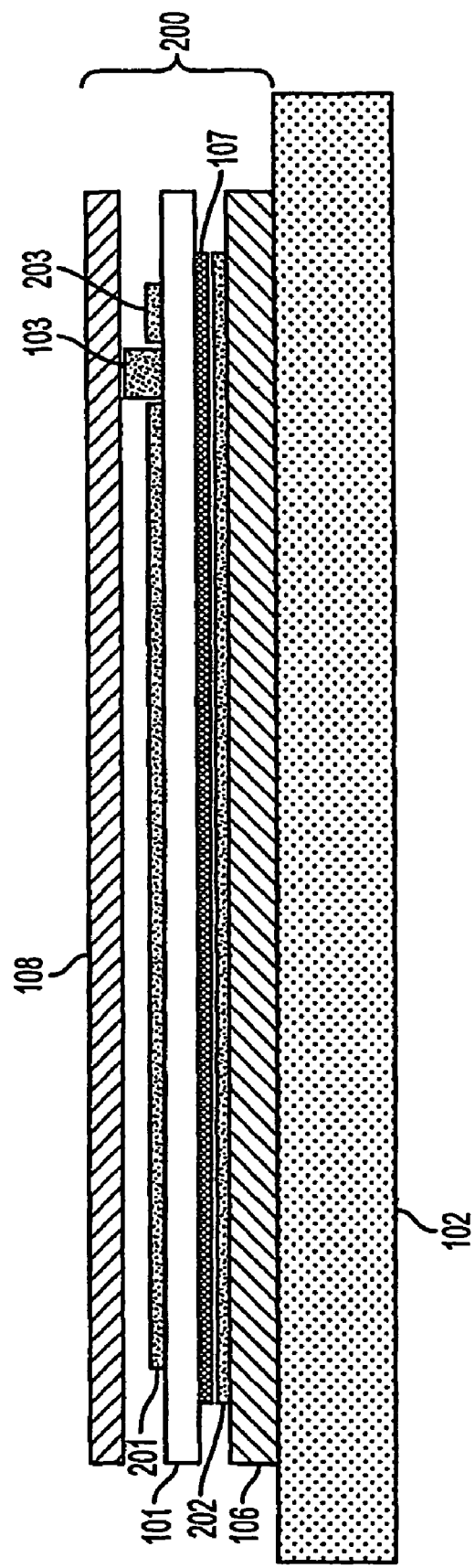
FIG. 2 is a schematic illustration of an RFID tag provides an indication of tampering by means of its RFID response.

FIG. 2 is a schematic illustration of a tamper indicating tag 200 that is a variation on the tamper indicating tag 100 of FIG. 1. The tag 200 provides a positive indication of tampering, whereas the tag 100 is disabled or its performance degraded if it is tampered.

The main differences between the tag 100 and the tag 200 are:
  in the case of the tag 200 the first electrically conductive region 104 of FIG. 1 comprises an RFID antenna 201 for the tag 200, without any contribution from the second electrically conductive region 105 of FIG. 1;
  in the case of the tag 200 the second electrically conductive region 105 is a tamper detection circuit 202 that is not coupled to the antenna 201 but that is coupled to the RFID IC 103 via a non-contact electrical coupling means.

Non-contact coupling of the tamper detection circuit 202 to the RFID IC 103 may preferably be enabled by means of an electrical tamper coupling circuit 203 that is connected directly to the RFID IC 103 on the top surface of the substrate 101. In another embodiment the coupling circuit 203 may not be included, and instead the tamper detection circuit 202 may couple to one or more electrical coupling circuits on the RFID IC 103.

The tamper detection circuit 202 is not required in order to enable the RFID function of the RFID tag 200. The RFID function of the tag 200 is provided by a combination of the RFID antenna 201 and RFID IC 103. The tamper detection circuit 202 is provided for the purpose of detecting tampering or removal of the substrate 101 or tag 200 from the surface 102. In the embodiment of FIG. 2 the RFID IC 103 is preferably configured to detect and monitor specified electrical properties of the tamper detection circuit 202, and in particular to be able to record or transmit information indicating the specified electrical properties or indicating a change in the specified electrical properties of the tamper detection circuit 202. A change in the specified electrical properties of the tamper detection circuit 202 is assumed to be indicative of damage or modification to the tamper detection circuit 202 and therefore indicative of the substrate 101 or tag 200 being tampered or removed from the surface 102. The tamper detection circuit 202 may be an open or closed electrical circuit, with the exact configuration depending on a number of factors, including which specified electrical properties of the tamper detection circuit 202 are being detected and monitored by the RFID IC 103.

Preferably the tag 200 will be designed such that the RFID antenna 201 and RFID IC 103 will not be damaged if the RFID tag 200 is tampered with or removed from the surface 102, in which case the RFID function of the tag 200 will continue after tampering or removal of the tag 200. In such a situation the RFID IC 103 will be able to detect damage to, or modification of, the tamper detection circuit 202, and thereby detect tampering or removal of the tag 200 from the surface 102, and will also be able to indicate to an RFID reading device that the tampering or removal has occurred.

As described in relation to the embodiment of FIG. 1, the second electrically conductive region 105 (the tamper detection circuit 202 of FIG. 2) will preferably be made using a conductive material that is intrinsically weak or frangible, and one or more adhesion modifying layers 107 will preferably be included to promote damage or disruption to the tamper detection circuit 202 if the substrate 101 or tag 200 is tampered or removed from the surface 102.

However, the RFID antenna 201 does not need to be made from a weak or frangible material. The RFID antenna 201 may be produced from one or more of a number of electrically conductive materials, including:
  one or more layers of solid metal conductor (such as copper or aluminum);
  electrically conductive ink that may be applied by means of a printing process;
  a mixture of metal conductor and conductive ink;
  one or more other electrically conductive materials.

An advantage of using a solid metal conductor for the RFID antenna 201 is that solid metal is usually of higher conductivity than conductive ink, and this can result in superior RFID performance for the tag 200.

The tag 200 may be either passive or active.

In one variation on the embodiment of FIG. 2 the tag 200 is passive and so the RFID IC 103 must be powered from a remote power source in order to be able to provide an RFID function and in order to be able to detect a change in the electrical properties of the tamper detection circuit 202. In this case the RFID IC 103 can only monitor the electrical properties of the tamper detection circuit 202, and therefore can only detect tampering or removal of the tag 200, when it is powered by the remote power source. In some preferred embodiments the RFID IC 103 will be powered by a remote RFID reading/writing device as the device irradiates the tag 200 to read data from, or write data to, the RFID IC 103. An RF reading/writing device that reads the RFID IC 103 in a passive tag 200 and thereby determines that the tamper detection circuit 202 has been modified or damaged may be configured to write information back to the RFID IC 103 to indicate that the tamper detection circuit 202 has been modified or damaged. Preferably the information that is written to the RFID IC 103 is locked so that it cannot subsequently be modified. In this way even if the tamper detection circuit is subsequently repaired the RFID IC 103 stores a permanent record that the tamper detection circuit 202 was modified or damaged and therefore that the tag 200 was tampered or removed from the surface 102.

In another variation on the preferred embodiment of FIG. 2 the tag 200 may be active, meaning that the RFID IC 103 is powered from within the tag 200, such as by means of a battery within the construction of the tag 200. In this case the RFID IC 103 can be configured to actively detect a change in the electrical properties of the tamper detection circuit 202 and thereby actively detect tampering with or removal of the tag 200. Such active detection of tampering by the RFID IC 103 may occur continuously, or at regular intervals, or on-demand, or according to some other detection protocol, the key point being that the RFID IC 103 is powered from within the tag and can therefore monitor and detect a change in the electrical properties of the tamper detection circuit 202 and can record or transmit information indicating that the change has occurred at times when the tag is not powered by an external power source such as an RFID reading/writing device. In one embodiment an active tag 200 may include an internal battery as a layer or film or laminate within the construction of the tag 200.

In the case of an active tag 200, if the RFID IC 103 detects that the tamper detection circuit 202 has been modified or damaged (by detecting a change in specified electrical properties of the tamper detection circuit 202) the active tag 200 may be configured to write information into the memory of the RFID IC 103 to indicate that the tamper detection circuit 202 has been modified or damaged. Preferably the information that is written into the RFID IC 103 is locked so that it cannot subsequently be modified. In this way even if the tamper detection circuit 202 is subsequently repaired the RFID IC 103 stores a permanent record that the tamper detection circuit 202 was modified or damaged and therefore that the tag 200 was tampered with or removed from the surface 102.

The following points should be understood with regard to the preferred embodiment of FIG. 2 and other embodiments described, illustrated, or referred to herein.

1. Reference is made herein to the RFID IC 103 recording or transmitting information indicative of specified electrical properties of the tamper detection circuit 202 or indicative of changes to the specified electrical properties of the tamper detection circuit 202. It should be appreciated that in the case of a passive tag 200, which must derive its energy from an external power source, the RFID IC 103 is only able to record or transmit the information when it is powered by an external power source. Preferably the RFID IC 103 will be powered by an RFID reading/writing device as the RFID reading/writing device attempts to read from, or write to, the RFID IC 103, in which case the RFID reading/writing device both powers the RFID IC 103 and reads from the RFID IC 103 information indicative of the values of the specified electrical properties of the tamper detection circuit 202 or indicative of changes to the values of the specified electrical properties of the tamper detection circuit 202.
2. Reference is made herein to the RFID IC 103 detecting changes to values of specified electrical properties of the tamper detection circuit 202. It should be appreciated that the changes may be either:
   changes relative to predetermined or preset values of the specified electrical properties; or
   changes relative to previously measured and stored values of the specified electrical properties for the same tamper detection circuit 202.
3. It should be appreciated that the specified electrical properties of the tamper detection circuit 202 detected or monitored by the RFID IC 103 may include one or more of the following:
   DC electrical impedance;
   electrical impedance at one or more non-zero frequencies, such as at the radio frequency at which the RFID tag 200 is designed to operate;
   response to a specific electrical signal input to the tamper detection circuit 202, such as the strength or time delay of reflectance of the electrical signal input to the tamper detection circuit 202; or
   other electrical properties.

Preferably the tamper detection circuit 202 is configured on the underside of the substrate 101 so that its electrical properties are modified in the event of tampering with or removal of even a small portion of the tag 200. In one preferred embodiment the tamper detection circuit 202 may be configured around the perimeter of the substrate 101 so that a disturbance to any portion of the perimeter of the tag 200 results in damage to the tamper detection circuit 202 and a consequent change to the electrical properties of the tamper detection circuit 202, which change is detectable by the RFID IC 103.

Figure 3:
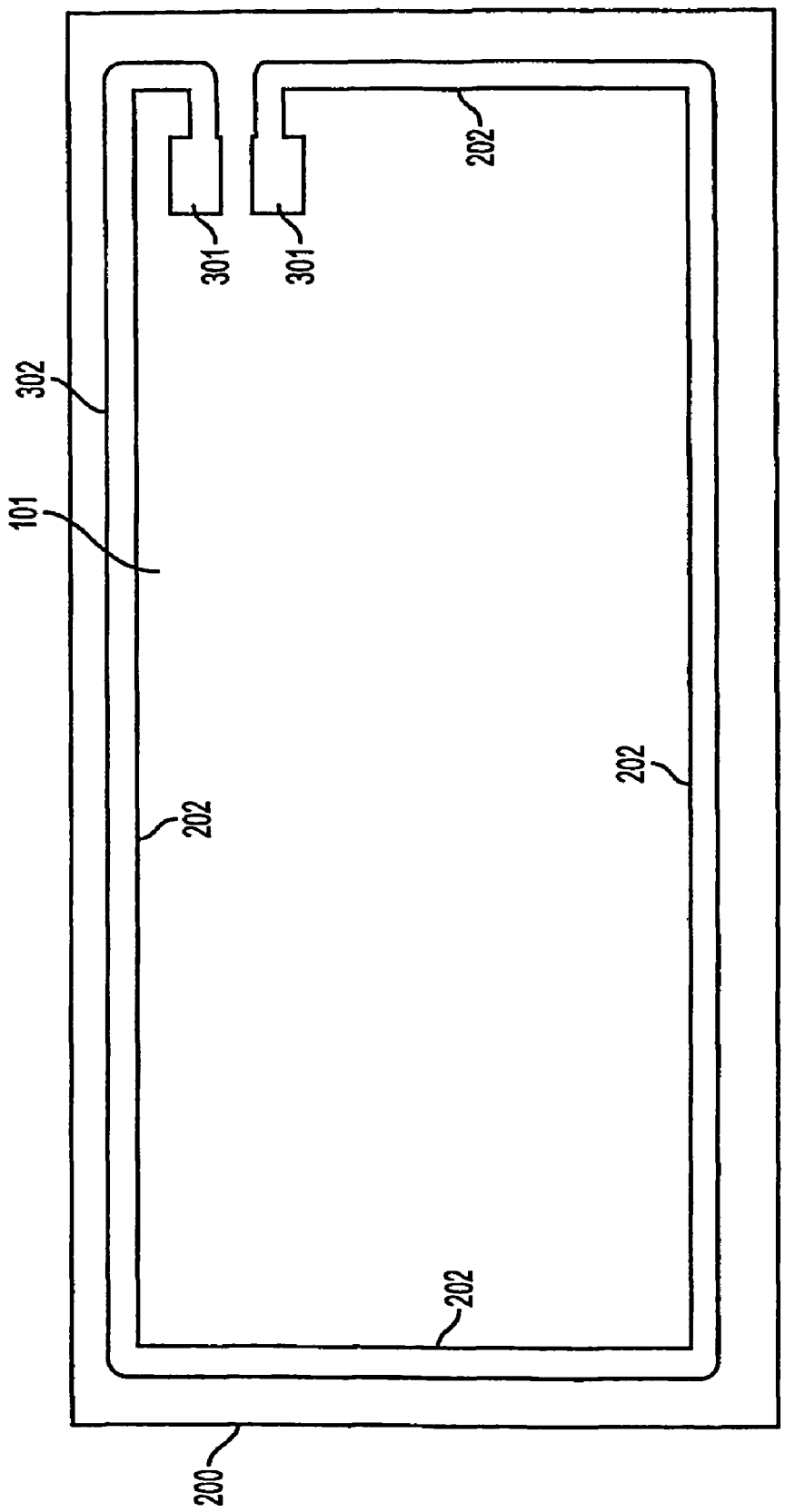
FIG. 3 is a schematic illustration of a preferred embodiment of a tamper detection circuit for the RFID tag of FIG. 2.

FIG. 3 is a schematic illustration of the tag 200 looking from below at the tamper detection circuit 202 and the underside of the substrate 101. FIG. 3 illustrates a preferred design for the tamper detection circuit 202 that may be used to facilitate detection by the RFID IC 103 of tampering with or removal of the tag 200. It should be appreciated that other designs for the tamper detection circuit 202 may also be used. In the preferred embodiment of FIG. 3 the RFID IC 103 is coupled to the tamper detection circuit 202 via a non-contact electrical coupling means such as inductive or capacitive coupling—in the embodiment in FIG. 3 capacitive coupling is illustrated—and is configured to detect and monitor the electrical impedance of the tamper detection circuit 202. In FIG. 3 coupling to the RFID IC 103 occurs via two electrical coupling circuits 301 that electrically couple to the tamper coupling circuit 203 on the top surface of the substrate 101, with the tamper coupling circuit 203 being connected to the RFID IC 103. Since capacitive coupling is used in this example to couple the tamper detection circuit 202 to the RFID IC 103, the RFID IC 103 will be configured to monitor the electrical impedance of the tamper detection circuit 202 at a non-zero frequency. It should be appreciated that many other embodiments are possible for the tamper detection circuit 202, based on the general principles described herein, and that other embodiments may involve the RFD IC 103 monitoring electrical properties of the tamper detection circuit 202 other than its electrical impedance.

In the preferred embodiment of FIG. 3 the tamper detection circuit 202 comprises two capacitive coupling pads 301—i.e. two electrically conductive pads that facilitate capacitive coupling of the RFID IC 103 to the tamper detection circuit 202—and an interconnecting electrically conductive path 302 that extends around the perimeter of the underside of the substrate 101. The impedance of the tamper detection circuit 202 will be modified if the tamper detection circuit 202 is damaged or disrupted through tampering of the tag 200 or removal of the tag 200 from the surface 102. In the embodiment of FIG. 3 the RFID IC 103 is configured to monitor the electrical impedance of the tamper detection circuit 202, and to record or transmit information if a change in the electrical impedance is detected by the RFID IC 103.

It should be appreciated that numerous variations are possible on the configuration of the tamper coupling circuit 203 and tamper detection circuit 202, based on the principles described herein.

In some embodiments of the present invention the tamper detection circuit 202 may be designed so as to enhance the performance of the RFID antenna 201. In one embodiment this may be achieved by designing the tamper detection circuit 202 such that it provides RF coupling to the antenna 201 and increases the RF energy collected by, or radiated from, the antenna 201.

FIG. 4 is another preferred embodiment of a tamper-indicating RFID tag that is the subject of the present invention.

FIG. 4C is a schematic illustration of a tamper indicating RFID tag 400 that is a variation on the RFID tag 100 of FIG. 1.

The main differences between the tag 100 and the tag 400 are:
- in the case of the tag 400 the first electrically conductive region 104 is absent and the second electrically conductive region 105 comprises the RFID antenna 401 for the tag 400;
- in the case of the tag 400 the RFID IC 103 is applied to a separate substrate 402 which is then in turn applied to the substrate 101, with the RFID IC 103 then being coupled to the antenna 401 through the substrate 101 via a non-contact coupling means.

FIG. 4A is a schematic illustration of the substrate 402 and associated electronics, including the RFID IC 103. FIG. 4C shows the substrate 401 coupled to substrate 402.

An advantage of the configuration of FIG. 4 is that the RFID IC 103 is applied to the tag 400 (via the substrate 402) in the final stages of tag manufacture, so that the remainder of the tag 400 (i.e. the tag 400 minus the substrate 402) can be produced using existing high speed tag manufacturing processes. The presence of the RFID IC 103 on the tag usually slows the tag production process, since the RFID IC 103 introduces a bump in the tag profile and is sensitive to physical and electrostatic damage.

The substrate 402 can be smaller in area than the tag 400, because both the RFID IC 103 and any non-contact electrical coupling circuitry connected to the RFID IC 103 on the substrate 402 are usually smaller in area than the antenna 401. This provides another manufacturing benefit in that the RFID IC "module" on the substrate 402 can be produced in large volumes more cost-effectively due to the fact that there will be more RFID IC's 103 placed per unit area of the substrate material 402.

In the embodiment of FIG. 4 the RFID IC 103 is applied to the underside of the substrate 402. Preferably, but not necessarily, one or more electrical coupling circuits 403 will connect to the RFID IC 103 and extend a distance onto the underside of the substrate 402. The coupling circuits 403 facilitate electrical non-contact coupling of the RFID IC 103 to the RFID antenna 401.

In the embodiment of FIG. 4 the RFID IC 103 is on the underside of the substrate 402, which has the advantage that the substrate 402 provides physical protection for the RFID IC 103.

An attachment means 404 is applied to the underside of the substrate 402 over the RFD IC 103 and coupling circuits 403. The attachment means 404 attaches the substrate 402 to the substrate 101 to complete the tag 400. Preferably the attachment means 404 is a layer of adhesive. FIG. 4B is a schematic illustration of the attachment layer 404.

In one preferred embodiment the substrate 402 is affixed to the substrate 101 such that the substrate 402 cannot be removed with the RFID IC 103 and antenna coupling circuits 403 intact. In this embodiment removal of the substrate 402 will result in damage or disruption to the RFID IC 103 or coupling circuits 403. Being able to remove the substrate 402 with the RFID IC 103 and other electronics on the substrate 402 intact would allow the substrate 402 to be applied to a second substrate 101 to provide a second functional RFID tag 400, which in some applications is undesirable. To prevent this, a tamper indicating construction is provided on the underside of the substrate 402, in order to prevent the substrate 402 being removed from the substrate 101 without its RFID performance being affected. The tamper indicating construction is intended to disrupt or damage the coupling circuits 403 or RFID IC 103 if the substrate 402 is removed from the tag 400.

In order to promote damage or disruption to the coupling circuits 403 or RFID IC 103 if the substrate 402 is removed from the tag 400 one or more adhesion modifying layers 405 may be applied in a specified pattern between the substrate 402 and the attachment means 404 so as to modify the relative adhesion of the substrate 402, the coupling circuits 403, the RFID IC 103, and the attachment means 404. The adhesion modifying layers 405 are similar to the adhesion modifying layers 107 in the embodiment of FIG. 1. In FIG. 4 the adhesion modifying layers 405 (there may be one or more) are shown between the substrate 402 and coupling circuits 403 or RFID IC 103, but it should be appreciated that the adhesion modifying layers 405 may instead or also be applied between the coupling circuits 403 or RFID IC 103 and the attachment layer 404. The adhesion modifying layers 405 may be applied in a specified pattern (as viewed from below the substrate 402) so as to create a plurality of areas of differing relative adhesions and thereby promote disruption to the coupling circuits 403 or RFID IC 103 if the substrate 402 is tampered or removed from the substrate 101. Where present, the adhesion modifying layer(s) 405 modifies adhesion between the layers that it separates, either by increasing or decreasing the adhesion. Preferably, but not necessarily, the adhesion modifying layer(s) 405 will act as a so-called release coating that reduces the adhesion of two layers that it separates, so that in the embodiment of FIG. 4 if the substrate 402 is removed from the substrate 101 the antenna coupling circuits 403 or the RFID IC 103 will tend to come off the substrate 402 and remain with the adhesive 404 on the substrate 101 in those areas where the adhesion modifying coating 405 is applied. Additionally, the adhesive 404 may be designed to be sufficiently strong that the RFID IC 103 will break or remain on the substrate 101 with the adhesive layer 404 if the substrate 402 is removed from the substrate 101. In a variation on this embodiment, the adhesion modifying layers 405 may be omitted and instead the surface on the underside of the substrate 402 may be treated, either uniformly or in a specified pattern, such that in the treated areas the adhesion to the substrate 402 of an adjacent layer is modified, either by being increased or by being decreased, relative to the adhesion of the adjacent layer to the substrate 402 in areas where the surface treatment has not been undertaken. The surface treatment on the underside of the substrate 402 would then have an effect similar to the effect of the adhesion modifying layer(s) 405.

In the preferred embodiment of FIG. 4 the RFID IC 103 and antenna coupling circuits 403 are on the underside of the substrate 402. In a variation on this embodiment the RFID IC 103 may be on the top side of the substrate 402 and connected to the antenna coupling circuits 403 on the underside of the substrate 402 by means of electrical through-connects through the substrate 402. This configuration has the advantage that the underside of the substrate 402 is flat, but has the disadvantage that the IC 103 on the top side of the substrate 402 is exposed and may need to be physically protected by means of an overlaminate or encapsulant.

In a variation on the embodiment of FIG. 4, non-contact coupling may occur between electrical coupling circuits on the RFID IC 103 and the antenna 401, so that the antenna coupling circuits 403 are not required. In a further variation, the substrate 402 may not be used and the RFID IC 103 may instead be applied directly to the top of the substrate 101 so as to provide non-contact coupling from the RFID IC 103 to the antenna 401. In this variation the RFID IC 103 may need to be provided with physical protection, for example by means of an encapsulant applied over the RFID IC 103 or by some other means.

The substrate 402 and attached electronics may be applied to the rest of the tag 400 either before or after the rest of the tag 400 has been applied to the surface 102. In one embodiment the tag 400 minus the substrate 402 (and attached electronics) may be applied to the surface 102, and the substrate 402 (plus attached electronics) may be applied to the substrate 101 at a later time to provide a fully functional tag 400. Prior to the application of the substrate 402 (and attached electronics) the rest of the tag 400 that has been applied to the surface 102 does not provide an RFID function.

In a variation on the embodiment of FIG. 4, both the antenna 401 (i.e. the second electrically conductive region 105 of FIG. 1) and the first electrically conductive region 104 (see FIG. 1) are present and are coupled to the RFID IC 103 via non-contact electrical coupling means. The antenna 401 may either couple to the RFID IC 103 via non-contact coupling, as in FIG. 4, or may couple to the first electrically conductive region 104 via non-contact coupling, with the first electrically conductive region 104 then coupling to the RFID IC 103 via non-contact coupling. In this variation both the antenna 401 and the first electrically conductive region 104 contribute to the RFID antenna performance of the tag 400. An advantage of this embodiment over the embodiment illustrated in FIG. 4 is that the first electrically conductive region 104 does not have to be made using a frangible electrical conductor, but could instead use a high-conductance material such as a solid metal layer, which may improve the overall RFID performance of the tag 400.

In another preferred embodiment based on the embodiment of FIG. 4 the substrate 402 (and attached electronics) may be applied to the substrate 101 using a removable means such as a removable adhesive 404 (preferably without the adhesion modifying coating 405), thereby allowing the substrate 402 (and attached electronics) and removable adhesive 404 to be removed from a first substrate 101 and applied to a second substrate 101 so as to:

disable the RFID function of a first tag 400; and
enable a fully functional second tag 400.

FIG. 5 is another preferred embodiment of a tamper-indicating RFID tag that is the subject of the present invention.

Figure 5A:
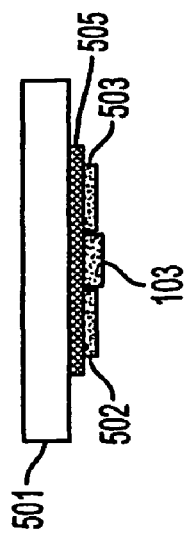
FIG. 5A is a schematic illustration of the second substrate of the embodiment of FIG. 5C, and the RFID components attached to the second substrate.
Figure 5B:
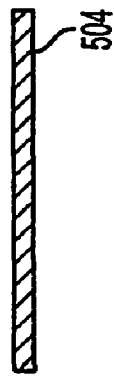
FIG. 5B is a schematic illustration of the attachment layer used to attach the second substrate in the embodiment of FIG. 5C.
Figure 5C:
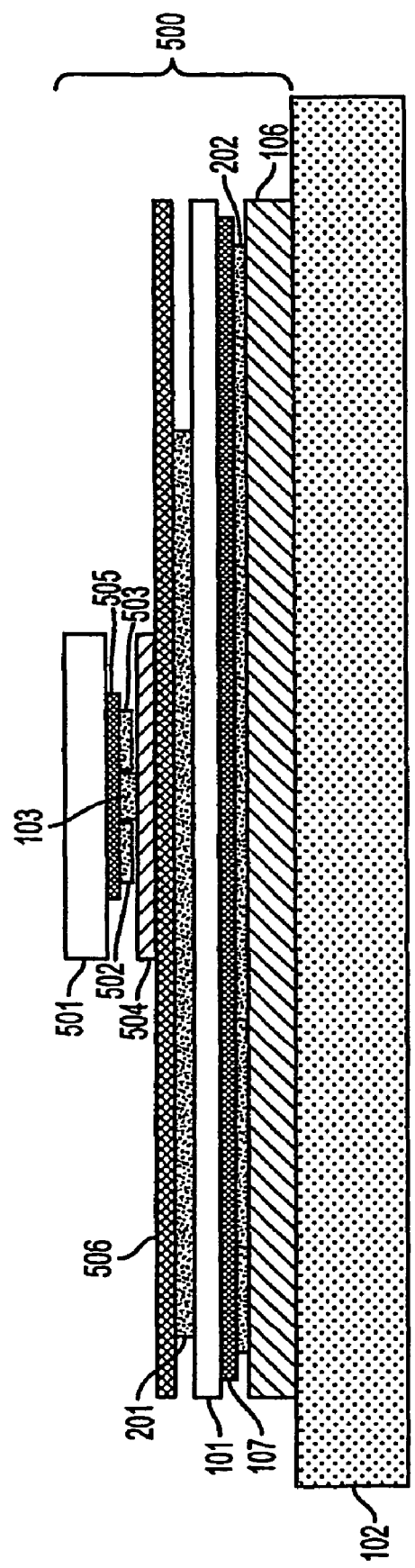
FIG. 5C is a schematic illustration of an RFID tag that provides an indication of tampering by means of its RFID response and in which the RFID IC is applied by means of a second substrate.

FIG. 5C is a schematic illustration of a tamper indicating RFID tag 500 that is a variation on the RFID tag 200 of FIG. 2, and that also includes some of the features of the embodiment of FIG. 4.

The main differences between the tag 200 and the tag 500 are:

in the case of the tag 500 the RFID IC 103 is applied to a separate substrate 501 which is in turn applied to the substrate 101, with the RFID IC 103 then being coupled to the antenna 201 via a non-contact coupling means, and also separately coupled to the tamper detection circuit 202 through the substrate 101 also via a non-contact coupling means.

FIG. 5A is a schematic illustration of the substrate 501 and associated electronics, including the RFID IC 103. FIG. 5C shows the substrate 501 coupled to the substrate 502.

The benefits of applying the RFID IC 103 to a separate substrate 501 that is then applied to the substrate 101 are described in relation to the embodiment of FIG. 4.

In FIG. 5 the RFID IC 103 is shown on the underside of the substrate 501, which has the advantage that the substrate 501 provides physical protection for the IC 103. Preferably, but not necessarily, one or more electrical antenna coupling circuits 502 will contact the RFID IC 103 and extend a distance onto the underside of the substrate 501. The antenna coupling circuits 502 facilitate electrical non-contact coupling of the RFID IC 103 to the RFID antenna 201. Preferably, but not necessarily, one or more electrical tamper coupling circuits 503 will contact the RFID IC 103 and extend a distance onto the underside of the substrate 501. The tamper coupling circuits 503 facilitate electrical non-contact coupling of the RFID IC 103 to the tamper detection circuit 202.

It should be appreciated that numerous variations are possible on the configuration of the antenna coupling circuits 502 and antenna 201, based on the principles described herein. For example, in those regions where coupling of the antenna coupling circuits 502 and antenna 201 occurs, the size, shape and layout of the antenna coupling circuits 502 and antenna 201 may be designed to allow for misalignment of the substrate 501 when it is applied to the substrate 101.

Similarly, it should be appreciated that numerous variations are possible on the configuration of the tamper coupling circuits 503 and tamper detection circuit 202, based on the principles described herein. For example, in those regions where coupling of the tamper coupling circuits 503 and tamper detection circuit 202 occurs, the size, shape and layout of the tamper coupling circuits 503 and tamper detection circuit 202 may be designed to allow for misalignment of the substrate 501 when it is applied to the substrate 101.

An attachment layer 504 is applied to the underside of the substrate 501 over the RFID IC 103 and coupling circuits 502 and 503. The attachment layer 504 attaches the substrate 501 to the substrate 101. Preferably the attachment layer 504 is a layer of adhesive. FIG. 5B is a schematic illustration of the attachment layer 504.

In one preferred embodiment the substrate 501 is affixed to the substrate 101 such that the substrate 501 cannot be removed with the RFID IC 103, antenna coupling circuits 502 and tamper coupling circuits 503 intact. In this embodiment removing the substrate 501 will result in damage or disruption to the REID IC 103 or antenna coupling circuits 502 or tamper coupling circuits 503. Being able to remove the substrate 501 with the RFID IC 103 and other electronics on the substrate 501 intact would allow the substrate 501 (and attached electronics) to be removed from a first substrate 101 and applied to a second substrate 101 to provide a second functional RFID tag 500, which in some applications is undesirable. In the preferred embodiment illustrated in FIG. 5 the substrate 501 is affixed to the substrate 101 by means of a layer of adhesive 504. In this embodiment one or more layers of adhesion modifying formulation 505 may be applied between the substrate 501 and the adhesive layer 504, as described in relation to the substrate 402 of FIG. 4, in order to promote breakup of the antenna coupling circuits 502, tamper coupling circuits 503 or RFID IC 103 if the substrate 501 is removed from the substrate 101.

In FIG. 5 the adhesion modifying layers 505 (there may be one or more) are shown between the substrate 501 and coupling circuits 502/503 or RFID IC 103, but it should be appreciated that the adhesion modifying layers 505 may instead or also be applied between the coupling circuits 502/503 or RFID IC 103 and the attachment layer 504. The adhesion modifying layers 505 may be applied in a specified pattern (as viewed from below the substrate 501) so as to create a plurality of areas of differing relative adhesions and thereby promote disruption to the coupling circuits 502/503 or RFID IC 103 if the substrate 501 is tampered or removed from the substrate 101.

Additionally, the adhesive layer 504 may be designed to be sufficiently strong that the RFID IC 103 will break or remain on the substrate 101 with the adhesive layer 504 if the substrate 501 is removed from the substrate 101. As described in relation to the embodiment of FIG. 4, in a variation on this embodiment the adhesion modifying layer 505 may be omitted and instead the surface on the underside of the substrate 501 may be treated, either uniformly or in a specified pattern, such that in the treated areas the adhesion to the substrate 501 of an adjacent layer is modified, either by being increased or by being decreased, relative to the adhesion of the adjacent layer to the substrate 501 in areas where the surface treatment has not been undertaken. The surface treatment on the underside of the substrate 501 would then have an effect similar to the effect of the adhesion modifying layer 505.

In the preferred embodiment of FIG. 5 coupling between the RFID IC 103 and antenna 201 is by a non-contact means. The adhesive layer 504 provides a gap between the electronics on the substrate layer 501 and the antenna 201. In some embodiments it may be necessary to apply a layer of dielectric 506 either on the substrate 101 over the antenna 201 or on the substrate 501 between the antenna coupling circuits 502 and antenna 201 to ensure that direct electrical connection does not take place between the RFID IC 103 and antenna 201. The layer of dielectric 506 may be configured to also provide physical protection for the RFID antenna 201.

In the preferred embodiment of FIG. 5 the RFID IC 103, antenna coupling circuits 502, and tamper coupling circuits 503 are all on the underside of the substrate 501. In a variation on this embodiment the RFID IC 103 may be on the top side of the substrate 501 and connected to the antenna coupling circuits 502 and tamper coupling circuits 503 on the underside of the substrate 501 by means of electrical through-connects through the substrate 501. This configuration has the advantage that the underside of the substrate 501 is flat, but has the disadvantage that the RFID IC 103 on the top side of the substrate 501 is exposed and may need to be physically protected by means of an overlaminate or encapsulant.

In a variation on the preferred embodiment of FIG. 5, non-contact coupling may occur between one or more electrical coupling circuits on the RFID IC 103 and the antenna 201, so that the antenna coupling circuits 502 are not required.

In a variation on the preferred embodiment of FIG. 5, non-contact coupling may occur between one or more electrical coupling circuits on the RFID IC 103 and the tamper detection circuit 202, in which case the tamper coupling circuits 503 are not required.

In a variation on the preferred embodiment of FIG. 5, non-contact coupling may occur between one or more electrical coupling circuits on the RFID IC 103 and the antenna 201, and in addition non-contact coupling may occur between one or more electrical coupling circuits on the RFID IC 103 and the tamper detection circuit 202, so that both the antenna coupling circuits 502 and the tamper coupling circuits 503 are not required.

In a variation on this embodiment the substrate 501 may not be used and the RFID IC 103 may instead be applied directly to the top of the substrate 101 so as to provide non-contact coupling from the RFID IC 103 to both the antenna 201 and tamper detection circuit 202. If necessary a dielectric layer 506 may be applied between the RFID IC 103 and the RFID antenna 201 to ensure direct electrical connection between the RFID IC 103 and antenna 201 does not occur. In this variation the RFID IC 103 may be provided with physical protection, for example by means of an encapsulant applied over the RFID IC 103 or by some other means.

The substrate 501 and attached electronics may be applied to the rest of the tag 500 either before or after the rest of the tag 500 has been applied to the surface 102. In one embodiment the tag 500 minus the substrate 501 (and attached electronics) may be applied to the surface 102, and the substrate 501 (plus attached electronics) may be applied to the substrate 101 at a later time to provide a fully functional tag 500. Prior to the application of the substrate 501 (and attached electronics) the rest of the tag 500 that has been applied to the surface 102 does not provide an RFID function.

In another preferred embodiment based on the embodiment of FIG. 5 the substrate 501 (and attached electronics) may be applied to the substrate 101 using a removable means such as a removable adhesive 504 (preferably without the adhesion modifying coating 505), thereby allowing the substrate 501 (and attached electronics) and removable adhesive 504 to be removed from a first tag 500 and applied to a second tag 500 so as to:

disable the RFID function of the first tag 500; and
enable a fully functional second tag 500.

Preferred Embodiments of the Substrates 101, 402 and 501

The substrates 101, 402 and 501 may be made from one or more of a number of materials or one or more different layers. Preferably the substrate material will be a thin, flexible layer. Preferably the substrate material will have consistent electrical properties—in particular a consistent dielectric constant. Examples of possible substrate materials include:

0.002" polyester film;
0.003" polyester film;
0.005" polyester film;
0.002" vinyl film;
0.003" vinyl film;
0.005" vinyl film.

It should be appreciated that other substrate materials may be used.

In some embodiments a substrate, such as the substrate 101, may be a composite material, made up of two or more films laminated together. An advantage of a laminated construction for the substrate layer 101 is that it allows different surface properties for the top side and underside of the substrate 101, which may assist in applying electronic circuits of different types to the top side and underside of the substrate 101. For example, in one embodiment solid metal circuits may be applied to the top side of the substrate 101 while circuits made from electrically conductive ink may be applied to the underside of the substrate 101, and it may be advantageous to have different surface properties on the top side and underside of the substrate 101 to facilitate this.

In some embodiments the top side or the underside of the substrate layer 101 may be treated in a specified pattern to either enhance or inhibit the attachment of an adjacent layer or component.

Setting up a Tag

The following descriptions are presented in relation to the tag 200, but could also apply to the tag 500, since both tags include a tamper detection circuit 202.

Variations in the electrical properties of the tamper detection circuit 202 will occur due to variations in the manufacture and assembly of the tag 200. Detection of tampering or removal of the tag 200 relies on the RFID IC 103 accurately detecting and monitoring changes in at least one electrical property of the tamper detection circuit 202. However, such changes may be masked by variations in the at least one electrical property resulting from manufacture and assembly of the tag 200. An example according to one embodiment of the invention of how this problem can be overcome is described below.

When the tag 200 is first assembled into a fully functional unit, an RF read/write device may be used to read the values of at least one electrical property of the tamper detection circuit 202 as detected by the RFID IC 103. The "initial values" of the at least one electrical property of the tamper detection circuit 202 may then be written to a memory location in the RFID IC 103 and preferably locked to avoid later modification. On subsequent reading of the RFID IC 103 the value of the at least one electrical property of the tamper detection circuit 202 that are detected by the RFID IC 103 can be compared with the "initial values" that were written to the memory of the RFID IC 103, and a determination made as to whether the detected values have changed relative to the "initial values", in turn indicating whether the tag 200 has been tampered or removed from the substrate 102 or whether the RFID IC 103 has been moved from one tag 200 to another tag 200.

Individualizing the Tamper Detection Circuit and Matching the Tamper Detection Circuit to the RFID IC The following descriptions are presented in relation to the tag 200, but could also apply to the tag 500, since both tags include a tamper detection circuit 202.

As described herein, the RFID IC 103 is configured to detect and monitor specified electrical properties of the tamper detection circuit 202.

In some preferred embodiments the tamper detection circuit 202 may be deliberately configured to have specified electrical properties that vary from one tamper detection circuit 202 to the next, thereby enabling different tamper detection circuits 202 to be identified and differentiated by an RFID IC 103, and further enabling a specific tamper detection circuit 202 to be matched to a specific RFID IC 103 during manufacture or assembly of a tag 200, thereby providing protection against an RFID IC 103 being removed from one RFID tag 200 and applied to a second tag construction to provide a fully functional second RFID tag 200.

In some preferred embodiments at least one electrical property of each tamper detection circuit 202 may be unique, so that no two tamper detection circuits 202 have the same values for those electrical properties. In other preferred embodiments specified electrical properties of the tamper detection circuit 202 may differ from one tamper detection circuit 202 to the next, but the specified electrical properties may not be unique, so that it may be possible for two tamper detection circuits 202 to have the same values for those electrical properties.

Matching of a tamper detection circuit 202 to an RFD IC 103 may in one embodiment be carried out as follows. After the tag 200 is assembled into a fully functional unit, an RFID read/write device may be used to read the at least one electrical property of the tamper detection circuit 202 as detected by the RFID IC 103. The values of the at least one electrical property, which may vary from one tamper detection circuit 202 to the next, may then be written to a memory location in the RFID IC 103 and preferably locked to avoid later modification. On subsequent reading of the RFID IC 103 the values of the at least one electrical property of the tamper detection circuit 202 that is detected by the RFID IC 103 will be compared with the value(s) of the at least one electrical property that was written to the RFID IC 103. If the values do not match, this will provide an indication that the RFID IC 103 is not attached to the matching tamper detection circuit 202 (i.e. that the RFID IC 103 is not attached to the tamper detection circuit 202 to which the RFID IC 103 was originally coupled when the tag 200 was first assembled).

There are numerous ways to deliberately vary the electrical properties of the tamper detection circuit 202 from one tamper detection circuit 202 to another, and configure the RFID IC 103 to read and differentiate the electrical properties.

In one preferred embodiment the RFD IC 103 may be configured to monitor the electrical impedance of the tamper detection circuit 202, and the tamper detection circuit 202 may be varied from one substrate 101 to another, either deliberately or by relying on intrinsic variations in manufacturing processes, so as to result in the impedance of the tamper detection circuit 202 varying from one substrate 101 to another. Variations in the impedance of the tamper detection circuit 202 may be the result of deliberate variations in:

- the layout of the tamper detection circuit 202;
- the widths or areas of the electrical traces or connections making up the tamper detection circuit 202;
- the thickness of the conductive material used to make the tamper detection circuit 202;
- the type of material used to make the tamper detection circuit 202;
- the areas and designs of the non-contact coupling circuits 203 used to couple the tamper detection circuit 202 to the RFD IC 103;
- other factors;

the deliberate variations being configured so as to result in various predetermined or post-determined values for the electrical impedance of the tamper detection circuit 202.

In another preferred embodiment the RFID IC 103 may be configured to send a signal or pulse into the tamper detection circuit 202, and the tamper detection circuit 202 may be configured such that portions of the signal or pulse are reflected back to the RFID IC 103 with different time delays, so that the relative time delays of the different reflected portions of the signal or pulse as detected by the RFID IC 103 represent to the RFID IC 103 a "time-signature" identifier for the tamper detection circuit 202, with the identifier differing from one tamper detection circuit 202 to the next.

It should be appreciated that tampering or removal of the tag 200 may be detected through the RFID IC 103 monitoring electrical properties of the tamper detection circuit 202 other than those described above, while still operating according to the general principles described herein.

In the above embodiments it may be necessary to be able to individually configure each tamper detection circuit 202 in order to provide each tamper detection circuit 202 with specified electrical properties that may be different from specified electrical properties of other tamper detection circuits 202. As described herein, the tamper detection circuit 202 may be made using electrically conductive ink that is applied by means of a printing process. In one preferred embodiment the tamper detection circuit 202 may be produced using a variable printing process with electrically conductive ink, where a variable printing process is one that allows the image or pattern of electrically conductive ink that is being printed to vary from one image or pattern to the next, so that the tamper detection circuit 202 on each tag may be printed with a different image or pattern of electrically conductive ink. One such variable printing process that may be used to apply the tamper detection circuit 202 is ink-jet printing of electrically conductive ink.

RFID Operating Frequencies

It should be appreciated that the embodiments of the present invention can be designed for operation at any of a number of RFID operating frequencies, including but not limited to:

at or about 125 kHz, where the preferred non-contact coupling means is inductive coupling;

at or about 13.56 MHz, where the preferred non-contact coupling means is inductive coupling;

at or about 915 MHz, where the preferred non-contact coupling means is capacitive coupling;

at or about 2.45 GHz, where the preferred non-contact coupling means is capacitive coupling;

at or about 5.8 GHz, where the preferred non-contact coupling means is capacitive coupling;

the above frequencies being frequencies commonly used at present in REID systems.

I claim:

1. An RFID tag, comprising:
a first substrate having oppositely facing first and second surfaces;
a second substrate having oppositely facing first and second surfaces, the first surface of the second substrate facing the second surface of the first substrate;
an RFID integrated circuit fixed to the first substrate so that the RFID integrated circuit and the first substrate together form an RFID integrated circuit module;
an RFID antenna disposed on the first surface of the second substrate and electrically coupled to the RFID integrated circuit via a non-contact coupling;
an electrically conductive region disposed on the second surface of the second substrate and electrically coupled to the RFID integrated circuit via a non-contact coupling;
a first adhesive layer between a surface of the RFID integrated circuit facing the second substrate and the first surface of the second substrate, the first adhesive layer attaching the RFID integrated circuit module to the second substrate;
the RFID integrated circuit being fixed to the second surface of the first substrate by a second adhesive layer;
at least one electrical coupling circuit on the second surface of the first substrate and connected to the RFID integrated circuit, the at least one electrical coupling circuit electrically coupling the RFID integrated circuit to the electrically conductive region via a non-contact coupling, and the at least one electrical coupling circuit electrically coupling the RFID integrated circuit to the RFID antenna via a non-contact coupling;
an adhesion modifying layer associated with the first and/or second adhesive layer, the adhesion modifying layer modifying adhesion of the RFID integrated circuit or the at least one electrical coupling circuit so that the RFID integrated circuit and/or the at least one electrical coupling circuit is modified if the RFID integrated circuit module is removed from the second substrate to indicate tampering of the RFID tag; and
an attachment layer on the second surface of the second substrate for attaching the second substrate to a receiving surface.

2. The RFID tag of claim 1, further including an attachment modifying layer modifying the attachment of the electrically conductive region such that the electrically conductive region is disrupted if the second substrate is tampered or removed from the receiving surface.

3. The RFID tag of claim 2, wherein the RFID integrated circuit is adapted to detect at least one electrical property of the electrically conductive region so that modifying the at least one electrical property of the electrically conductive region is detected by the RFID integrated circuit.

4. The RFID tag of claim 3, wherein the RFID integrated circuit is adapted to record or transmit information representing the at least one electrical property of the electrically conductive region.

5. The RFID tag of claim 2, wherein the attachment modifying layer is arranged between the second surface of the second substrate and the electrically conductive region.

6. The RFID tag of claim 2, wherein the attachment layer is a layer of adhesive and the attachment modifying layer is an adhesion modifying layer.

7. The RFID tag of claim 3, wherein the at least one electrical property is an electrical impedance value of the electrically conductive region.

8. The RFID tag of claim 3, further comprising a power source within the tag and coupled to the RFID integrated circuit.

9. The RFID tag of claim 3, wherein the non-contact coupling is a capacitive coupling or an inductive coupling.

10. The RFID tag of claim 1, wherein the attachment layer is arranged between the electrically conductive region and the receiving surface.

11. The RFID tag of claim 1, further comprising a power source within the tag and coupled to the RFID integrated circuit.

12. The RFID tag of claim 1, wherein the non-contact coupling is a capacitive coupling or an inductive coupling.

13. The RFID tag of claim 1, wherein a surface area of the second surface of the first substrate is smaller than a surface area of the first surface of the second substrate.

14. An RFID tag, comprising:
a first substrate having oppositely facing first and second surfaces;
a second substrate having oppositely facing first and second surfaces, the first surface of the second substrate facing the second surface of the first substrate;
an RFID integrated circuit fixed to the first substrate so that the RFID integrated circuit and the first substrate together form an RFID integrated circuit module;
an RFID antenna disposed on the second surface of the second substrate and electrically coupled to the RFID integrated circuit via a non-contact coupling;
a first adhesive layer between a surface of the RFID integrated circuit facing the second substrate and the first surface of the second substrate, the first adhesive layer attaching the RFID integrated circuit module to the second substrate;
the RFID integrated circuit being fixed to the second surface of the first substrate by a second adhesive layer;
at least one electrical coupling circuit on the second surface of the first substrate and connected to the RFID integrated circuit, the at least one electrical coupling circuit electrically coupling the RFID integrated circuit to the RFID antenna via a non-contact coupling;
an adhesion modifying layer associated with the first and/or second adhesive layer, the adhesion modifying layer modifying adhesion of the RFID integrated circuit or the at least one electrical coupling circuit so that the RFID integrated circuit and/or the at least one electrical coupling circuit is modified if the RFID integrated circuit module is removed from the second substrate to indicate tampering of the RFID tag; and
an attachment layer on the second surface of the second substrate for attaching the second substrate to a receiving surface.

15. The RFID tag of claim 14, further including an attachment modifying layer modifying the attachment of the RFID antenna such that the RFID antenna is disrupted if the second substrate is tampered or removed from the receiving surface.

16. The RFID tag of claim 14, wherein the attachment layer is a layer of adhesive and the attachment modifying layer is an adhesion modifying layer.

17. The RFID tag of claim 14, further comprising a power source within the tag and coupled to the RFID integrated circuit.

18. The RFID tag of claim 14, wherein the non-contact coupling is a capacitive coupling or an inductive coupling.

19. The RFID tag of claim 14, wherein a surface area of the second surface of the first substrate is smaller than a surface area of the first surface of the second substrate.

20. A method of manufacturing an RFID tag, comprising:
   forming an RFID integrated circuit module by fixing an RFID integrated circuit to a first substrate having oppositely facing first and second surfaces, the RFID integrated circuit being fixed to the second surface of the first substrate by a first adhesive layer;
   forming an RFID antenna on a second substrate having oppositely facing first and second surfaces, the RFID antenna being formed on the first surface of the second substrate, the first surface of the second substrate facing the second surface of the first substrate;
   forming an electrically conductive region on the second surface of the second substrate;
   forming at least one electrical coupling circuit on the second surface of the first substrate and connected to the RFID integrated circuit, the at least one electrical coupling circuit electrically coupling the RFID integrated circuit to the electrically conductive region via a non-contact coupling, and the at least one electrical coupling circuit electrically coupling the RFID integrated circuit to the RFID antenna via a non-contact coupling;
   forming an adhesion modifying layer associated with the RFID integrated circuit and/or the at least one electrical coupling circuit;
   forming a second adhesive layer on the second surface of the first substrate over the RFID integrated circuit and the at least one electrical coupling circuit;
   attaching the RFID integrated circuit module to the second substrate via the second adhesive layer by applying the second surface of the first substrate to the first surface of the second substrate so that the RFID antenna is electrically coupled to the RFID integrated circuit via a non-contact coupling and the electrically conductive region is electrically coupled to the RFID integrated circuit via a non-contact coupling; and
   the adhesion modifying layer modifying adhesion of the RFID integrated circuit and/or the at least one electrical coupling circuit so that the RFID integrated circuit and/or the at least one electrical coupling circuit is modified if the RFID integrated circuit module is removed from the second substrate to indicate tampering of the RFID tag.

21. A method of manufacturing an RFID tag, comprising:
   forming an RFID integrated circuit module by fixing an RFID integrated circuit via a first adhesive layer to a first substrate having oppositely facing first and second surfaces;
   forming an RFID antenna on a surface of a second substrate, the second substrate facing the second surface of the first substrate;
   forming at least one electrical coupling circuit on the second surface of the first substrate and connected to the RFID integrated circuit, the at least one electrical coupling circuit electrically coupling the RFID integrated circuit to the RFID antenna via a non-contact coupling;
   forming an adhesion modifying layer associated with the RFID integrated circuit and/or the at least one electrical coupling circuit;
   forming a second adhesive layer on the second surface of the first substrate over the RFID integrated circuit and the at least one electrical coupling circuit;
   attaching the RFID integrated circuit module to the second substrate via the second adhesive layer by applying the second surface of the first substrate to the second substrate so that the RFID antenna is electrically coupled to the RFID integrated circuit via a non-contact coupling; and
   the adhesion modifying layer modifying adhesion of the RFID integrated circuit and/or the at least one electrical coupling circuit so that the RFID integrated circuit or the at least one electrical coupling circuit is modified if the RFID integrated circuit module is removed from the second substrate to indicate tampering of the RFID tag.

22. The method of claim 21, wherein the second substrate has a first surface facing the first substrate and a second surface opposite the first surface, and the RFID antenna is formed on the second surface of the second substrate.

* * * * *